United States Patent Office 3,816,401
Patented June 11, 1974

---

3,816,401
EXHAUST GAS CONVERSION PROCESS AND CATALYST
Rowland C. Hansford, Yorba Linda, Calif., assignor to Union Oil Company of California, Los Angeles, Calif.
No Drawing. Filed May 25, 1972, Ser. No. 256,839
Int. Cl. B01d 53/00
U.S. Cl. 423—213.5                                2 Claims

ABSTRACT OF THE DISCLOSURE

Process and catalyst for the catalytic conversion of nitrogen oxides, unburned hydrocarbons and carbon monoxide in internal combustion engine exhaust gases. The catalyst comprises essentially a composite of copper oxide and iron oxides which has been precalcined at high temperatures, between about 1200° and 2400° F. The composite catalyst is more active than either component alone, and more active than the same composites calcined at lower temperatures.

BACKGROUND AND SUMMARY OF INVENTION

Much effort has been devoted in recent years to the development of catalytic converters for removing air pollutants such as hydrocarbons, carbon monoxide and nitrogen oxides from engine exhaust gases. A general approach has been to provide a two-stage conversion system (as illustrated for example in U.S. Pat. 3,544,264), involving an initial contacting zone in which the raw exhaust gases are passed under reducing conditions over a suitable catalyst in the absence of added air, followed by a second zone in which oxidation of remaining CO and hydrocarbons is effected by adding to the first stage off-gases at least a stoichiometric proportion of air. Exemplary reactions which are believed to occur at least to some extent in the first conversion stage are as follows:

$$2CO + 2NO \longrightarrow N_2 + CO_2 \quad (1)$$
$$CO + H_2O \rightleftarrows CO_2 + H_2 \quad (2)$$
$$C_xH_y + xH_2O \rightleftarrows xCO + \left(\frac{y}{2} + x\right)H_2 \quad (3)$$
$$2NO + 2H_2 \longrightarrow N_2 + 2H_2O \quad (4)$$
$$2NO + 5H_2 \longrightarrow 2NH_3 + 2H_2O \quad (5)$$

These reactions occur under what may be designated "net reducing" conditions, i.e., conditions wherein the mole ratio of oxygen to carbon monoxide and hydrocarbons is less than stoichiometric. Reactions 2 and 3 seldom go to completion, so that the off gases from the first stage nearly always comprise at least an equilibrium proportion of carbon monoxide and hydrocarbons. It is hence necessary to provide a second oxidation stage with added air in order to complete the oxidation of carbon monoxide and hydrocarbons. The catalysts of this invention are useful in both stages of these systems, but are exceptionally active for nitrogen oxide (NO$_x$) conversion in the first stage. Moreover, at temperatures above about 1100° F., they are very selective for converting NO$_x$ to elemental nitrogen (reactions 1 and 4) rather than to ammonia (reaction 5). This is a decided advantage because any ammonia formed in the first stage is oxidized in the second stage back to NO which is then emitted to the atmosphere as a pollutant.

In addition to their selectivity and exceptionally high activity for NO$_x$ conversion, the present catalysts are found to bring about a substantial oxidation of the carbon monoxide and hydrocarbons in the raw exhaust gas, presumably through the mechanisms of equations 2 and 3 above. This is very surprising, considering that net reducing conditions prevail. Notwithstanding this factor, it is found that the unburned hydrocarbons are substantially completely oxidized, and normally at least about 50 percent of the carbon monoxide is oxidized. Having achieved a selective and substantially complete conversion of nitrogen oxides to nitrogen, a substantially complete oxidation of unburned hydrocarbons, and a substantial conversion of carbon monoxide, it will be apparent that the need for a second oxidation stage is materially reduced, or in many cases eliminated. In cases where complete conversion of carbon monoxide is not required, the catalysts of this invention may be utilized in a single stage converter, and if higher conversion levels are required, a two-stage system may be utilized in which the second stage is materially reduced in size.

The catalysts of this invention are also advantageous in avoiding excessive heat evolution, thus eliminating the need of air pumps or expensive heat resistant materials of construction. The use of air in conventional two-stage systems to oxidize hydrocarbons and carbon monoxide often results in overheating of the second stage, depending upon air/fuel ratios to the engine and resultant hydrocarbon and oxygen content of the raw exhaust gases. In my conversion system, air injection is either materially reduced or eliminated, thus reducing the overall exothermicity of the conversion. Under the normal range of engine operating conditions (principally air/fuel ratios), the net thermal effect of reactions 1 through 5 above is exothermic but under any given set of operating conditions, the concurrence of endothermic reactions 2 and 3 with exothermic reactions 1, 4 and 5 substantially reduces the overall heating effect. It will be apparent also that in cases where a second stage is utilized, the oxidation load therein is reduced, thus reducing the heat output in that stage also.

In broad aspect, the catalysts of this invention are intimately admixed composites of iron oxide and copper oxide which have been calcined at temperatures between about 1200° and 2400° F. for a sufficient time to convert at least a portion of the components to a spinel form such as CuFe$_2$O$_4$. Expressed as oxides, the composites may contain (by weight) at least about 1% CuO, and at least about 1% Fe$_2$O$_3$, and the weight ratio of CuO/Fe$_2$O$_3$ is between about 1/5 and 5/1. The preferred composites contain at least about 4% CuO and at least about 4% Fe$_2$O$_3$, and the preferred CuO/Fe$_2$O$_3$ ratio is between about 4/6 and 6/4. The most critical aspect of the invention resides in the calcination temperature. When the CuO-Fe$_2$O$_3$ composites are calcined at temperatures below about 1200° F., their activity for NO$_x$ conversion is usually no higher than that of copper oxide alone. But at calcination temperatures between about 1200° and 1400° F., a substantial increase in activity occurs, presumably due to the formation of a spinel phase. Further increase in activity takes place up to calcination temperatures of about 1800°–2400° F. It is preferred however to control the calcination time so as to prevent the formation of a sharply crystalline spinel phase. It is further preferred that an excess of CuO be present over the stiochiometric ratio for CuFe$_2$O$_4$.

DETAILED DESCRIPTION

The catalysts of this invention may be prepared by several different methods, in supported or unsupported form, and may take a variety of shapes, forms and sizes. Unsupported catalysts may be prepared for example by coprecipitating the hydroxides or carbonates of copper and iron from an aqueous solution of mixed salts of the two metals, using for examples sodium hydroxide or sodium carbonate to effect coprecipitation. The coprecipitate is then filtered off, washed thoroughly to remove sodium ions, may then be formed into suitable pellets, prills, tablets or extrudates by conventional methods, preferably with the aid of a suitable binder, e.g., 5–20 weight-percent of a gelatinous, acid-peptized alumina. Other conventional binders such as clays and the like may also be utilized. The granular composites so obtained are then dried and calcined as described hereinafter.

The coprecipitation technique however is not essential. Fully equivalent results have been obtained by mixing the powdered metal oxides, mulling with peptized alumina or other suitable binder, extruding, drying and calcining. Other compounds, such as the metal carbonates, oxalates, nitrates, acetates, or similar salts whose anions can be readily decomposed during calcination, can also be used in preparing the catalyst by the co-mulling technique.

While highly active catalysts can be prepared by the above techniques, the resulting essentially undiluted composites generally have an undesirably high density. Low density composites of substantially equal activity may be prepared for example by grinding the comulled or coprecipitated metal compounds to micron or sub-micron size and then coextruding or copelleting the mixture with relatively large amounts of alumina or other inert matrices such as clays, silica gel, silica-alumina, and the like. Precalcined composites of iron oxide and copper oxide may similarly be powdered and coextruded or copelleted with such inert matrices. By either of these methods, the final composite is again dried and calcined.

Suitable low density catalysts may also be prepared by conventional impregnation methods wherein a porous, inert support such as Carborundum, alpha alumina, delta alumina, mullite, aluminum phosphate or the like, in suitable granular or monolithic form, is impregnated either sequentially or simultaneously with an aqueous solution or solutions of the nitrates or other soluble and heat-decomposable compounds of copper and iron, followed by draining, drying and calcining of the impregnated support. The metal content of the impregnated catalysts may range between about 1 and 20 percent, preferably 4–10 percent of copper as CuO, and between about 1 and 20 percent, preferably 4–10 percent of iron as $Fe_2O_3$. Both in the supported and unsupported catalyst compositions the weight ratio of Cu/Fe, calculated as CuO and $Fe_2O_3$, is between about 1/5 and 5/1, preferably between about 4/6 and 6/4. It is found that a mole excess of CuO over the stoichiometric ratio in the spinel, $CuFe_2O_4$, is desirable to achieve maximum $NO_x$ conversion activity. Although the metal contents and ratios have been expressed herein in terms of oxides, it is not to be concluded that those oxide forms are the active species in the final catalyst. It would appear in fact that the lower valent oxides, $Cu_2O$ and FeO, or even the respective free metals, may be at least in part the active species.

The dried catalyst composites, prepared by any of the above methods, are then calcined for about 0.5 to 12 hours or more at temperatures ranging between 1200° and 2400° F., preferably about 1600°–2000° F. The calcining is normally carried out in air (static or flowing), but may be effected in any suitably inert atmosphere. Conventional techniques may be utilized, e.g., heating in a rotary forced-air furnace, passing hot gases through a static bed of the catalyst, etc. Preferably the heat-up to calcination temperature should be somewhat gradual over a period of e.g., ½ to 1 hour. Time and calcination temperature should be controlled and correlated so as to achieve a substantial, but preferably incomplete, formation of a crystalline spinel phase, as determined by X-ray diffraction analysis.

Following the calcination, the catalysts may if desired be subjected to reduction with hydrogen or carbon monoxide at e.g., 700–1000° F., although this procedure normally offers no real advantage over placing the calcined catalyst directly on-stream for in-situ reduction by the exhaust gases.

The following examples are cited to illustrate the invention, but are not to be construed as limiting in scope.

EXAMPLES 1–3

Three unsupported catalysts of the present invention were prepared by coprecipitation of $Cu(OH)_2$ and

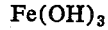

$Fe(OH)_3$ with sodium hydroxide from a solution of the nitrate salts. The coprecipitation was carried out by metering a stream of the salt solution and a stream of NaOH solution into the inlet of a centrifugal pump. By this means a very rapid mixing of the solutions at a constant pH of about 7.5 was readily accomplished. The gelatinous precipitate was filtered, dried at 220° F., and washed free of sodium (0.01%) by a stream of deionized water flowing upward through the granular solid. The washed product was dried and pulverized through a 100-mesh screen. The powder was then thoroughly mulled with enough gelatinous acid-peptized alumina to give 10 percent by weight of alumina in the final product. The mulled mix was extruded through a 1/16" die, dried, and calcined for 3 hours at 1100°, 1400° and 1800° F. (separate portions). The finished catalysts contained about 10% $Al_2O_3$, 45% CuO and 45% $Fe_2O_3$ by weight.

The three catalysts were then activity tested for $NO_x$ conversion, using a synthetic exhaust gas composed as follows:

|  | Mole percent |
|---|---|
| CO | 1.0 |
| $H_2$ | 0.33 |
| $C_3H_6$ | 0.10 |
| NO | 0.08 |
| $H_2O$ | 10.0 |
| Air ($O_2$) | 1.43 (0.3) |
| $CO_2$ | 13.0 |
| $N_2$ | 74.06 |
|  | 100.00 |

The test procedure consisted in passing the feed gas through the catalyst bed at a gaseous hourly space velocity of 23,000, measuring NO conversion at about 1000° F. (which generally gives 100% conversion), then at successively lower temperatures so as to bracket the 50% conversion temperature and obtain temperature coefficients. From this the 50% conversion temperatures were calculated, based on the first-order rate equation. The results were as follows:

TABLE 1

| Catalyst | Calcination temp., ° F. | Temp., ° F. for 50% conversion of NO |
|---|---|---|
| A | 1,100 | [1] 1,014 |
| B | 1,400 | 536 |
| C | 1,800 | 488 |

[1] 30% conversion.

It will be seen that the catalyst calcined at 1100° F. was markedly less active than the other two, and the catalyst calcined at 1800° F. was substantially more active than the 1400° F. calcined composition.

EXAMPLES 4–15

Twelve additional catalysts containing varying proportions of CuO and $Fe_2O_3$ were prepared by the same general methods described in Examples 1–3, except that the highest temperature calcining operation was carried out under somewhat less severe conditions (utilizing a different furnace), resulting in the formation of spinel phases which were not so sharply crystalline as those formed in Example 3 (catalyst C). Upon activity testing these catalysts as described in Examples 1–3, the following results were obtained:

TABLE 2

| Catalyst | Catalyst composition, wt. percent (Ex. 10 wt.-percent Al₂O₃ binder) | | Calcn. temp., °F. | Temp. for 50% NO conv., °F. |
| --- | --- | --- | --- | --- |
| | CuO | Fe₂O₃ | | |
| D | 100 | 0 | 1,400 | 545 |
| E | 100 | 0 | 1,800 | 530 |
| F | 67 | 33 | 1,400 | 542 |
| G | 67 | 33 | 1,800 | 504 |
| H | 50 | 50 | 1,400 | 510 |
| I | 50 | 50 | 1,800 | 330 |
| J | 33 | 67 | 1,400 | 487 |
| K | 33 | 67 | 1,800 | 471 |
| L | 20 | 80 | 1,400 | 572 |
| M | 20 | 80 | 1,800 | 501 |
| N | 0 | 100 | 1,400 | 737 |
| O | 0 | 100 | 1,800 | 937 |

It will be seen that the 1800° F. calcined $CuO\text{-}Fe_2O_3$ mixtures were substantially more active than either CuO or $Fe_2O_3$ alone. Also, the 1800° F. calcined composites were significantly more active than the corresponding composites calcined at 1400° F. In the case of pure $Fe_2O_3$, the activities were reversed for the 1400° and 1800° calcinations. A rather sharp maximum in activity appears to occur at the 50/50 proportion of CuO and $Fe_2O_3$ (catalyst I).

The following claims and their obvious equivalents are intended to define the true scope of the invention.

I claim:

1. A method for the conversion of nitrogen oxides in engine exhaust gases, which comprises contacting said exhaust gases at elevated temperatures with a catalyst in which the active component is essentially an intimately admixed, calcined composite of copper oxide and iron oxide in which the weight ratio of Cu/Fe is between about 6/4 and 4/6, as $CuO/Fe_2O_3$, said composite having been calcined at temperatures between about 1600° and 2000° F. for a sufficient time to form a spinel phase.

2. A method as defined in claim 1 wherein the weight ratio of Cu/Fe in said composite is about 1/1, as $CuO/Fe_2O_3$.

References Cited

UNITED STATES PATENTS

| 1,946,964 | 2/1934 | Cobb | 423—594 X |
| 3,230,034 | 1/1966 | Stiles | 423—213 X |
| 2,754,172 | 7/1956 | Went et al. | 423—594 |
| 2,370,443 | 2/1945 | Blefeld | 423—594 X |
| 3,544,264 | 12/1970 | Hardison | 423—213 |
| 3,476,508 | 11/1969 | Kearby et al. | 423—213 |
| 2,818,418 | 12/1957 | Rottig | 252—474 X |

GEORGE O. PETERS, Primary Examiner

U.S. Cl. X.R.

252—474